UNITED STATES PATENT OFFICE.

EDWIN A. SCRIBNER, OF BROOKLYN, NEW YORK.

PROCESS OF MANUFACTURING ARTIFICIAL FERTILIZERS.

SPECIFICATION forming part of Letters Patent No. 283,427, dated August 21, 1883.

Application filed November 14, 1882. (No specimens.)

*To all whom it may concern:*

Be it known that I, EDWIN A. SCRIBNER, a citizen of the United States, and a resident of Brooklyn, in the county of Kings and State of New York, have invented certain new and useful Improvements in Processes of Manufacturing Artificial Fertilizers, of which the following is a specification.

My invention relates to methods of treating phosphatic rock for the production therefrom of artificial fertilizers.

The object of the process which constitutes my present invention is to render available a larger proportion of the fertilizing principle contained in the rock than has been heretofore done, or, in other words, to obtain an increased proportion of phosphoric acid from the same in a condition suitable for mixing with ammoniacal or other matters in the production of fertilizers.

Heretofore in the treatment of these mineral phosphates the material has usually been calcined or roasted, and then combined with sulphuric or other acid, while in many instances other substances have been added, and the compounds subjected to various treatments in order to obtain fair results. Over these processes my present invention is an improvement, the process which I have discovered being not only more economical, but yielding a very much larger percentage of phosphatic material in a condition known in the art as "reverted" or "available."

Broadly stated, my invention consists in simultaneously exposing the phosphatic rock to the action of applied heat and pure sulphur, or its equivalents—such as sulphurous anhydride—and in another application I have described and claimed a method of carrying out this process by roasting the ground mineral with a small admixture of granulated sulphur. Another method discovered by me of effecting the same results is to grind and roast the mineral, and to introduce to it, while hot, the sulphur in the condition of vapor, or as sulphurous anhydride, and with this method my present application is more particularly concerned.

The following is a description of the process: Any desired quantity of phosphatic rock—such as is commonly known as phosphate of iron and alumina—is first crushed or ground and brought to a high temperature. It is desirable to employ for this purpose a closed retort of any ordinary construction, in order that as much as possible of the sulphur vapor or sulphurous fumes subsequently introduced may be saved by sublimation. In a separate receptacle sulphur vapor or sulphurous anhydride is produced by the heating or burning of sulphur, or compounds containing the same—such as iron pyrites—and the vapor or fumes are forced into the retort containing the mineral while the latter is roasting. By the action of heat, water is dissociated from the mineral, and by the chemical reaction resulting from the heat and the mixing of the vapor of water and the vapor of sulphur or sulphurous anhydride sulphurous acid is formed, which, acting on the mineral, produces a large proportion of available phosphate. In the case of phosphate of iron and alumina sufficient water is contained in the mineral itself to produce the requisite chemical reaction. Certain other substances, however—such as the phosphate of lime—contain little or no water in their composition, and in these cases the deficiency may be supplied by introducing into the heated retort a jet of steam along with the sulphur vapor.

In order that the action of the vapor of sulphur may reach all portions of the mineral, the latter is agitated during the time that the vapor is introduced. This may be done by stirring the mass or revolving the receptacle in which it is contained.

The roasting and admission of vapor are to be carried on simultaneously, and care must be taken that the water contained in the mineral is not driven off before the vapor is introduced, as otherwise no chemical change would take place. The amount of sulphur vapor introduced should be about two per cent., by weight, of the mineral, and when passed slowly through the heated mass the mineral assumes a darker shade and becomes much finer. When sulphurous anhydride is used, the amount may be determined by the effects produced, which are the same as when sulphur vapor is employed.

After the mineral has been subjected to the treatment above described it becomes a commercially valuable fertilizing compound, containing a large percentage of available phosphoric acid. It may then, without further treatment, be mixed with potash or ammoniacal matters, as is usually done in the manufacture of these substances.

Having now described my invention, what I claim is—

1. The process herein described of manufacturing fertilizing compounds from mineral phosphates, which consists in grinding and roasting the phosphates, and forcing through the mineral, while roasting, the vapor of sulphur or sulphurous anhydride, as and for the purpose set forth.

2. The process of manufacturing fertilizing compounds from mineral phosphates, which consists in grinding and roasting the phosphates in a proper receptacle, producing the vapor of sulphur or sulphurous anhydride in a separate receptacle, and forcing the same through the roasting mineral, as set forth.

In testimony whereof I have hereunto set my hand this 11th day of November, 1882.

EDWIN A. SCRIBNER.

Witnesses:
PARKER W. PAGE,
W. FRISBY.